July 15, 1958     A. E. SHARPLES     2,843,493
METHOD OF MAKING A FROZEN CONFECTION
Filed June 6, 1956
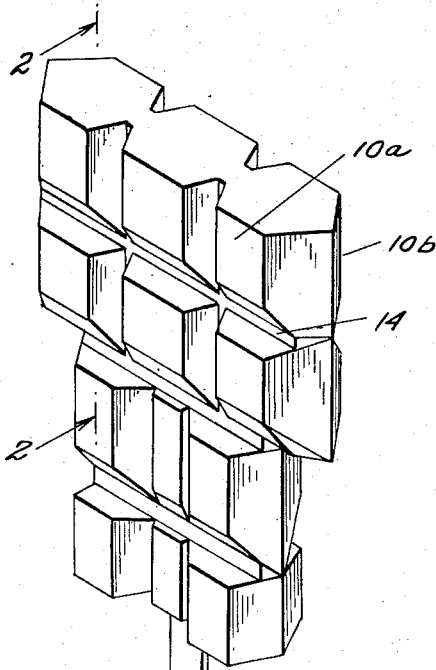
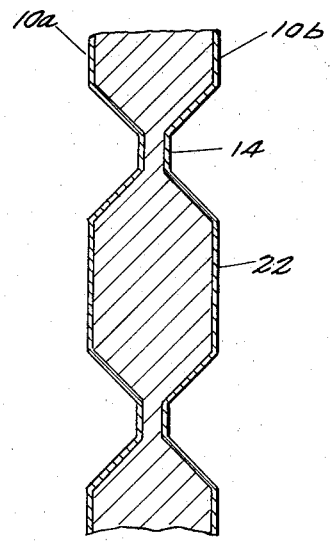
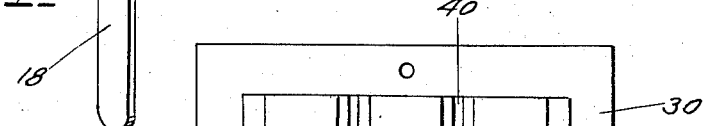
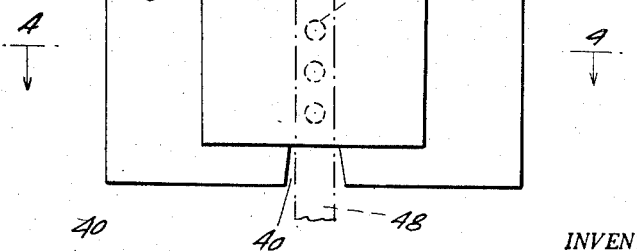
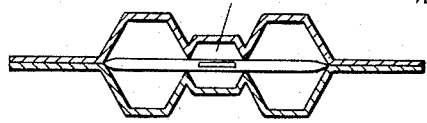
INVENTOR.
ARTHUR E. SHARPLES
BY *Ostrolenk, Faber,*
*Gerb & Soffen*
ATTORNEYS

United States Patent Office 2,843,493
Patented July 15, 1958

2,843,493

METHOD OF MAKING A FROZEN CONFECTION

Arthur E. Sharples, Jersey City, N. J.

Application June 6, 1956, Serial No. 589,620

4 Claims. (Cl. 99—136)

This invention relates to frozen confections and more particularly to confections made of frozen fruit juices with or without frozen pulps.

It is an object of my invention to provide a frozen confection having nutritive value and which may be manufactured by a very simple method.

It is a further object of my invention to provide a frozen confection shaped so as to be easily eaten from a stick.

It is another object of my invention to provide a frozen fruit confection which will resist melting prior to being eaten.

It is a still further object of my invention to provide a simple method of making a frozen fruit confection which will yield an article of a shape which is convenient to eat and having long lasting keeping qualities in addition to being resistant to melting in ordinary room temperatures and wherein the central portion is not frozen solid but consists of flavored ice shavings.

Briefly, my invention comprises the making of a frozen confection on a stick wherein the confection is segmented. Thus, the confection consists of a series of bite-size nuggets aligned in ranks and rows and having interconnecting portions of relatively less thickness. The nuggets and the integral connecting portions are formed by means of a mold and the general appearance of the article is similar to that of a waffle. Thus, in eating, the nuggets may be readily seized by the teeth and broken off by virtue of the relatively thin cross-section of the interconnecting portions. Accordingly, a predetermined portion of the confection may be taken into the mouth and readily dissolved. The waffle shape of the confection obviates the tendency of children to take too large a bite of a frozen confection which causes considerable discomfort to the tongue, gums and teeth because of the freezing effect of a large mass. Further, owing to the fact that the nugget components are of a predetermined size, an ample portion may be readily broken off from the confection by means of the teeth, leaving the remainder of the waffle-like structure integral and only lightly subjected to the warmth of the consumer's mouth so that the tendency of the confection to melt while being eaten is minimized.

My particular method of manufacturing the confection results in an article comprised primarily of ice shavings retained in a hard-frozen thin exterior skin that resists melting at ordinary room temperatures while the degree of freezing inwardly from the surface is lessened so that once taken in the mouth, after initial melting of the hard-frozen surface, the mouthful is readily dissolved. Such process comprises the steps of freezing a fruit juice or fruit pulp and then shaving the frozen mass. The shavings are then placed in a mold having substantially identical top and bottom elements of waffle-like configuration. An important aspect of placing the shavings in the mold is the fact that no pressure is brought to bear on the shavings. The mold halves are merely filled with the shavings and then scraped to remove any excess shavings which may protrude beyond the parting line of the mold halves.

A further important aspect of the process is to have the mold above freezing temperature or to subsequently warm the mold so as to melt that portion of the shavings immediately contiguous with the mold surfaces. The mold is then closed and quick frozen. In this manner, the liquefied surface of the contents is melted into a solid frozen coating which entirely covers the exterior of the article. After the quick freezing process, the temperature of the mold is raised to about 40° F. so as to effect release of the waffle-like confection. The mold is provided with a means for accommodating a stick which is frozen into the interior of the confection. Due to some expansion of the confection during the quick freezing process, the stick is firmly gripped.

A detailed description of my invention will now be given in conjunction with the appended drawing in which:

Figure 1 is a perspective view of the confection as it would appear in readiness to be eaten.

Figure 2 is a section through line 2—2 of Figure 1.

Figure 3 is a plan view of one of the mold halves.

Figure 4 is a section through line 4—4 of Figure 3 but showing both mold halves in assembled position as would occur in the course of molding the confection.

Referring to Figures 1 and 2, the confection comprises a row of waffle-like structures of generally T formation having integral components comprising nuggets 10a and 10b on opposite faces, connecting webs 14 between the nuggets, and a stick 18 gripped centrally of the configuration as shown. The entire surface 22 of the confection is hard frozen so as to form a surrounding melt-resistant shell. The degree of freezing varies from the surface to the center of the configuration and it will be understood that depending upon the temperature of the process, the inner core of the confection may be either in a frozen state or a semi-frozen state, as desired. Preferably, the deep freezing should not be carried out to the point where the center is no longer ice shavings although the material in the interior may be somewhat mushy, if desired. Accordingly, the degree of hardness from surface to interior depends on the thickness of the nuggets and the temperature and time of quick freezing which may be varied to effect whatever characteristics of the final article are found most popular.

Reference is made to Figures 3 and 4 showing the fundamental structure of a mold for manufacturing the confection described herein. The mold may consist of two substantially identical mold halves 30 having flanges 32 and holes 34 for locating pins. The particular mold illustrated is for the purpose of making a single confection and is provided with a series of truncated pyramidal cavities 38 of perhaps 1 inch square dimension at the larger ends. Thus, each "bite-size" piece of the confection would consist of two nuggets back to back with the thickness of web 14 therebetween and having a volume of perhaps 1 cubic inch. The cavities 38 are separated by lanes 40 which are machined some 3/64" below the face of the flange so as to provide a suitable thickness of cross-section for webs 14 which being much thinner than the nuggets are hard frozen in the process to effect rigidity. Thus, the article may be considered in a geometric sense as a slab having protruding nuggets on each face wherein the nuggets are aligned back to front and of truncated, pyramidal form. Of course, the exposed portion of the theoretical slab consists only of webs 14 running longitudinally and transversely intermediate the nuggets. The lower end of each mold half is provided with openings 44, which openings register when the halves are assembled, thus forming an aperture into which a stick 48 may be thrust. The stick is shown in phantom lines in Figure 3 and is preferably provided with through-bores 50 which effect a locked condition of the stick in the frozen confection.

The specific article molded by the disclosed mold consists of a T configuration having 6 nuggets in the cross of the T on each side of the common median plane and four nuggets on each side of the vertical bar of the T on each side of the common median plane. This configuration I have found to be convenient for eating and also effects a strengthening of the common slab from which the nuggets protrude to prevent accidental breakage of the lanes between the nuggets which might result in more nuggets being broken off than is desired at one time. Thus, it will be apparent that the vertical grooves or valleys are foreshortened so that they run between no more than two nuggets. Likewise, the two lower horizontal valleys pass between only two nuggets; the only valley passing between three nuggets on each side being the uppermost horizontal valley.

In the carrying out of the process, as hereinabove indicated, I first freeze a mass of fruit juice or fruit pulp and then scrape the mass to produce shavings with which the mold halves are filled, but wherein the shavings are not packed tightly into the mold halves. The joining surfaces of the mold halves are scraped to remove excess shavings which might cause overpacking of the shavings when the mold halves are brought together. The assembled mold is then subjected to a temperature of about 40° F. to produce a wet or liquid condition of the surface of the charge where is contacts the mold surfaces. I have found 40° F. a sufficiently high temperature to produce liquification of the surface of the charge within a reasonably short time, leaving the bulk of the shavings intact. Thereafter, the mold is thrust into a quick freezing unit of any suitable type so as to quick freeze the product for a suitable length of time to produce a hard frozen surface skin of the confection which effects cells that contain flavored ice shavings. Thus, the hard-frozen skin preserves the product and resists melting at room temperature, yet is easily dissolved in the mouth because it extends into the nuggets only to a slight degree of the order of 3/64 inch.

It will, of course, be understood that I may control the deep freezing process as well as the initial liquefying of the surface of the charge by any controls involving time and temperature to get whatever effect is desired. The basic objective is to get a relatively hard frozen skin on the confection so that the center may even be in liquid condition but fully contained within the ice shell.

The final step consists merely of heating the mold to any suitable degree of temperature, 40° F. again being found suitable, so that the mold halves will release their grip on the charge and the mold may be readily disassembled whereat the confection may be stripped therefrom.

Having thus described my invention, I am aware that various changes may be made without departing from the spirit thereof and accordingly I do not seek to be limited to the precise illustration except as set forth in the appended claims.

I claim:

1. The method of making a frozen comestible having a soft core and a hard frozen skin, which comprises placing a charge of frozen shavings in a mold, heating said charge within said mold to liquefy the surface of said charge contiguous with the mold, and deep freezing the charge in said mold to form the liquefied surface into a hard frozen skin.

2. The method as set forth in claim 1, wherein the pressure of the shavings within said mold is not substantially greater than the weight of said shavings within said mold.

3. The method as set forth in claim 1, wherein said surface of the charge is liquefied by heating of said mold above the melting point of said shavings.

4. The method as set forth in claim 1, wherein the pressure of the shavings within said mold is not substantially greater than the weight of said shavings within said mold, wherein said surface of the charge is liquefied by heating of said mold above the melting point of said shavings.

References Cited in the file of this patent

UNITED STATES PATENTS

| | | |
|---|---|---|
| D. 127,285 | Siemund | May 20, 1941 |
| 1,167,563 | Ingram | Jan. 11, 1916 |
| 1,639,122 | Whitman | Aug. 16, 1927 |
| 1,896,529 | Tressler et al. | Feb. 7, 1933 |
| 2,288,970 | Weisbender | July 7, 1942 |